United States Patent
Canel et al.

(10) Patent No.: US 9,023,246 B2
(45) Date of Patent: May 5, 2015

(54) PHASE POWDERS AND PROCESS FOR MANUFACTURING SAID POWDERS

(75) Inventors: Jérôme Canel, Le Kremlin-Bicetre (FR); François Tenegal, Paris (FR)

(73) Assignee: Commissariat a l'Energie Atomique, Paris (FR)

(*) Notice: Subject to any disclaimer, the term of this patent is extended or adjusted under 35 U.S.C. 154(b) by 939 days.

(21) Appl. No.: 12/301,803

(22) PCT Filed: May 29, 2007

(86) PCT No.: PCT/EP2007/055195
§ 371 (c)(1), (2), (4) Date: Nov. 21, 2008

(87) PCT Pub. No.: WO2007/138052
PCT Pub. Date: Dec. 6, 2007

(65) Prior Publication Data
US 2010/0247910 A1    Sep. 30, 2010

(30) Foreign Application Priority Data
May 30, 2006    (FR) ..................... 06 51960

(51) Int. Cl.
*H01B 1/00* (2006.01)
*C04B 35/00* (2006.01)
(Continued)

(52) U.S. Cl.
CPC ............. *C01B 21/0602* (2013.01); *B82Y 30/00* (2013.01); *C01B 31/30* (2013.01); *C01P 2004/62* (2013.01);
(Continued)

(58) Field of Classification Search
CPC ............ B22F 2998/10; B22F 9/082; B22F 2003/248; B22F 1/0085; C04B 35/56; C04B 35/5607; C04B 35/5611; C04B 35/5615; C04B 35/5618; C04B 35/58014; C04B 35/565; C04B 35/645; C04B 35/5622; C04B 35/58; C04B 35/58007; C04B 35/58021; C04B 35/4508; C04B 35/465; C04B 35/495; C04B 35/58028; C04B 35/58035; C01B 21/06; C01B 21/0602; C01B 21/0615; C01B 21/0617; C01B 21/062; C01B 21/076; C01B 21/0828; C01B 31/30; C01B 31/305; C01P 2004/62; C01P 2004/64; B82Y 30/00; B82Y 40/00
USPC .................. 252/500; 423/279, 351, 414, 423; 117/2; 501/87, 92, 93, 96.4
See application file for complete search history.

(56) References Cited

U.S. PATENT DOCUMENTS 3,617,358 A * 11/1971 Dittrich ..................... 427/447
5,656,138 A *  8/1997 Scobey et al. ........... 204/192.12
(Continued)

FOREIGN PATENT DOCUMENTS

EP    1 378 304         1/2004
EP    1378304 A2 *     1/2004
(Continued)

OTHER PUBLICATIONS
Machine translation of JP2006-001829A.*
(Continued)

*Primary Examiner* — Carol M Koslow
*Assistant Examiner* — Lynne Edmondson
(74) *Attorney, Agent, or Firm* — Brinks Gilson & Lione

(57) ABSTRACT

The invention relates to powder comprising at least one element M, at least one element A and at least one element X, in the respective proportions $(n+1\pm\epsilon_1)$, $1\pm\epsilon_2$ and $n\pm\epsilon_3$, in which:
A is chosen from Cd, Al, Ga, In, Tl, Si, Ge, Sn, Pb, P, As and S; M is a transition metal;
X is chosen from B, C and N;
n is an integer equal to 1, 2 or 3; and
$\epsilon_1$, $\epsilon_2$ and $\epsilon_3$ independently represent a number ranging from 0 to 0.2,
said powder having a mean particle size of less than 500 nm.

9 Claims, 1 Drawing Sheet

(51) Int. Cl.
  C04B 35/56    (2006.01)
  C01B 21/06    (2006.01)
  B82Y 30/00    (2011.01)
  C01B 31/30    (2006.01)
  C04B 35/58    (2006.01)
  C04B 35/626   (2006.01)
  C04B 35/645   (2006.01)
  C04B 35/80    (2006.01)

(52) U.S. Cl.
  CPC ......... *C01P 2004/64* (2013.01); *C04B 35/5607* (2013.01); *C04B 35/5611* (2013.01); *C04B 35/5615* (2013.01); *C04B 35/5618* (2013.01); *C04B 35/5622* (2013.01); *C04B 35/58007* (2013.01); *C04B 35/58014* (2013.01); *C04B 35/58021* (2013.01); *C04B 35/58028* (2013.01); *C04B 35/58035* (2013.01); *C04B 35/6262* (2013.01); *C04B 35/645* (2013.01); *C04B 35/806* (2013.01); *C04B 2235/5224* (2013.01); *C04B 2235/5244* (2013.01); *C04B 2235/5248* (2013.01); *C04B 2235/5445* (2013.01); *C04B 2235/5454* (2013.01); *C04B 2235/81* (2013.01)

(56) References Cited

U.S. PATENT DOCUMENTS

| | | | | |
|---|---|---|---|---|
| 5,942,455 | A * | 8/1999 | Barsoum et al. | 501/91 |
| 6,461,989 | B1 * | 10/2002 | El-Raghy et al. | 501/87 |
| 6,593,150 | B2 * | 7/2003 | Ramberg et al. | 438/3 |
| 2003/0126948 | A1 * | 7/2003 | Yadav et al. | 75/346 |
| 2003/0203205 | A1 * | 10/2003 | Bi et al. | 428/402 |
| 2004/0067355 | A1 * | 4/2004 | Yadav et al. | 428/323 |
| 2005/0076825 | A1 * | 4/2005 | Isberg et al. | 117/2 |
| 2005/0262965 | A1 * | 12/2005 | Palanisamy et al. | 75/236 |
| 2006/0088435 | A1 * | 4/2006 | Gupta et al. | 419/13 |
| 2006/0199013 | A1 * | 9/2006 | Malshe et al. | 428/409 |
| 2006/0202389 | A1 * | 9/2006 | El-Raghy et al. | 264/301 |
| 2009/0294274 | A1 * | 12/2009 | Guizard et al. | 204/157.41 |

FOREIGN PATENT DOCUMENTS

JP   2006001829 A * 1/2006
WO   WO 2005038985 A2 * 4/2005

OTHER PUBLICATIONS www.britannica.com/EBchecked/topic/1109065/nanoparticle, (nanoparticle definition), printed Aug. 7, 2014.*

English language translation of the International Preliminary Report on Patentability from corresponding International Application No. PCT/EP2007/055195, filed May 29, 2007.

International Search Report and Written Opinion completed Oct. 18, 2007, in International Application No. PCT/EP2007/055195, filed May 29, 2007.

International Preliminary Report on Patentability from corresponding International Application No. PCT/EP2007/055195, filed May 29, 2007.

French Search Report dated Apr. 2, 2007, in French Patent Application No. 0651960, filed May 30, 2006.

Leconte, Y., et al., "Elaboration of SiC, TiC, and ZrC Nanopowders by Laser Pyrolysis: From Nanoparticles to Ceramic Nanomaterials", Glass Physics and Chemistry, 2005, p. 510-518, vol. 31, No. 4.

Wu, J.Y., et al., "Tribological behavior of $Ti_2SnC$ particulate reinforced copper matrix composites", Materials, Science and Engineering, 2006, p. 266-271, vol. 422, No. 1-2.

* cited by examiner

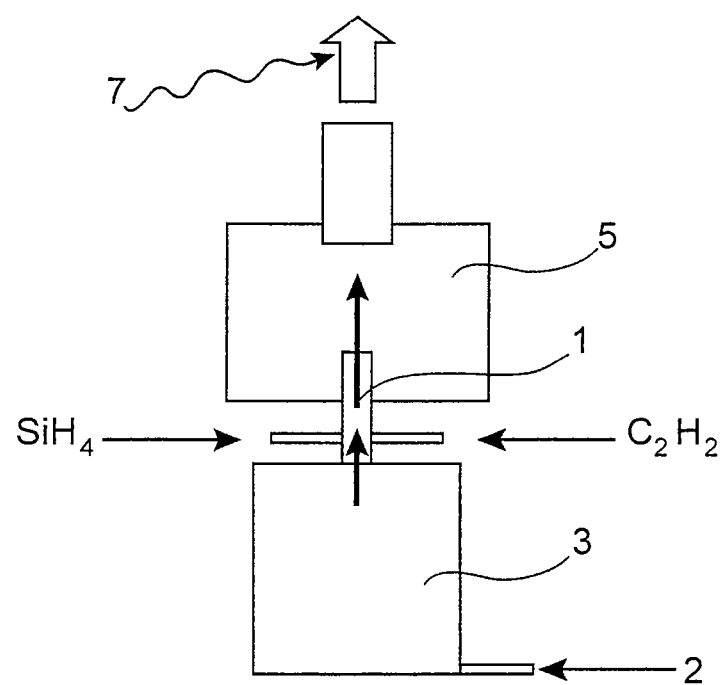

PHASE POWDERS AND PROCESS FOR MANUFACTURING SAID POWDERS

This application is a National Stage application of International Application No. PCT/EP2007/055195 filed May 29, 2007, the entire contents of which is hereby incorporated herein by reference. This application also claims the benefit under 35 U.S.C. §119 of French Patent Application No. 06 51960 filed May 30, 2006, the entire contents of which is hereby incorporated herein by reference.

TECHNICAL FIELD

The present invention relates to nanoscale powders (or nanopowders), particularly MAX phase powders, and to their manufacturing process.

MAX phases represent an exceptionally wide range of materials. They conventionally satisfy the general formula: $M_{n+1}AX_n$, where M is a transition metal (such as Ti, V, Cr, Zr, Nb, Hf or Ta), A is an element chosen from Cd, Al, Ga, In, Tl, Si, Ge, Sn, Pb, P, As and S, and X is a metalloid element chosen from B, C and N.

This class of materials is characterized by a hexagonal crystal structure containing a stack of nanolayers and a small proportion of non-metallic atoms (25%, 33% and 37.5% when n is equal to 1, 2 and 3 respectively).

These materials possess both a metallic character and properties close to those of ceramics, in the sense that they are capable of retaining their shape at very high temperatures.

They are therefore applicable in fields as varied as electronics (for example using the compound $Ti_2SnC$), self-lubricating coatings (for example in the agri-food industry), moulding or casting templates, structural parts in aeronautics.

PRIOR ART

MAX-type materials are conventionally obtained in the form of thin films by physical vapour deposition (PVD) or chemical vapour deposition (CVD), or are in the form of powders (for example obtained by arc melting followed by grinding, or by heat treatment of elemental powders), or else directly in the form of bulk materials using powder metallurgy as method of production (for example by sintering elemental powders).

Thus, in 1967, Jeitschko and Novotny produced $Ti_3SiC_2$ by heating titanium hydride, silicon and graphite powders at 2000° C. for 20 minutes, and cooling them rapidly to 1200° C.

Other authors have produced $Ti_3SiC_2$ by the reactive sintering of a mixture of Ti, TiC and Si powders at around 1300-1600° C. in a vacuum. However, this process has the drawback of vaporizing the silicon, resulting in a shift in the stoichiometry. Attempts at adjusting the initial silicon proportion have failed to obtain pure $Ti_3SiC_2$. This failure is generally imputed to the decomposition of $Ti_3SiC_2$ at high temperature according to the following scheme:

$Ti_3SiC_2(s) \rightarrow 3TiC_{0.67}(s) + Si(g)$.

Other methods followed, based on eliminating the undesirable products by a chemical route after synthesis. Thus, hydrogen fluoride treatments have been used to eliminate $TiS_2$, by oxidation at 450° C. in air for 10 hours, to convert TiC followed by dissolution of $TiO_2$ using an ammonium sulphate/sulphuric acid mixture at 100° C. These methods are tedious and accompanied by a low yield and serious environmental drawbacks.

Another method consists in cold-compacting a mixture of Ti, Si and C powders, in optionally arc-melting them and heating them to 900° C. for 24 hours in quartz tubes evacuated beforehand, and then for 5 hours at 1400° C. or for 100 hours at 1200° C. In both cases, $Ti_3SiC_2$ is formed, but in the presence of other phases. At best, the $TiS_2$ has to be eliminated using hydrofluoric acid at the end of the process in order to obtain powders of better than 99% purity.

Finally, another process for synthesizing $Ti_3SiC_2$ consists in mixing titanium, silicon carbide and graphite powders, applying strict control as to the oxygen partial pressure during the reactive sintering treatment so as to prevent the decomposition of $Ti_3SiC_2$ by the following mechanism:

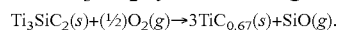

$Ti_3SiC_2(s) + (\frac{1}{2})O_2(g) \rightarrow 3TiC_{0.67}(s) + SiO(g)$.

However, this control requires the use of a stream of gas (for example argon or hydrogen) and also a sacrificial powder (for example titanium powder) serving to trap the oxygen, and the amount and positioning of which require to be determined by a prior series of trials followed by chemical analysis of the products obtained. Under the best conditions, the proportion of undesirable compounds may be up to 2% by volume.

Thus, in general, all the processes relating to the formation of MAX-type materials are processes allowing bulk materials to be obtained that start from a powder mixture containing the various chemical species desired in the final product. This has drawbacks that impair to a large extent the purity of the final product. This is because, on the one hand, the starting powder must be as pure as possible, so as to guarantee the purity of the final product, but, on the other hand, to allow a rapid, complete and homogeneous reaction to take place in the solid phase, the various powders must be intimately mixed and therefore must be fine powders. However, fine metal powders are difficult to obtain owing to their ductility and are dangerous to store because of their highly pyrophoric nature. In addition, they are even more subject to oxidation, and therefore incompatible with the objective of high purity. Furthermore, the powders must be mixed under particular conditions in which the atmosphere and any contamination caused by the device used for the grinding must be controlled. In addition, there is therefore no method for getting round the problems associated with the very local nature of the solid-phase reactions for forming the desired species, and therefore of preventing the formation reaction being heterogeneous and liable to result in a composite containing products other than the desired species.

What is more, no method has existed hitherto for obtaining nanopowders with a particle size less than 500 nm that would give a powder reactivity capable of facilitating its consolidation by sintering, that would result in fine microstructures (impossible to obtain starting from conventional powders) and would thereby have enhanced properties. Nanopowders also mean that it is possible to envisage manufacturing composites containing long fibres by infiltration with a suspension of nanoparticles, the size of which ensures a high fill factor in the interstices between the fibres, and thereby a low porosity of the matrix.

The inventors were therefore set the objective of developing a process for obtaining nanopowders with a high degree of purity, with a mean particle size of less than 500 nm, which process is simple to implement and economically compatible with manufacture on an industrial scale and allows great flexibility in the choice of composition, great precision in the stoichiometry and homogeneity on a scale of less than one micron.

SUMMARY OF THE INVENTION

Thus, the invention provides, according to a first subject, a powder comprising at least one element M, at least one element A and at least one element X, in the respective proportions $(n+1\pm\epsilon_1)$, $1\pm\epsilon_2$ and $n\pm\epsilon_3$, in which:

A is chosen from Cd, Al, Ga, In, Tl, Si, Ge, Sn, Pb, P, As and S;

M is a transition metal;

X is chosen from B, C and N;

n is an integer equal to 1, 2 or 3; and $\epsilon_1$, $\epsilon_2$ and $\epsilon_3$ independently represent a number ranging from 0 to 0.2, said powder having a mean particle size of less than 500 nm.

The elements M, A and X in the powder may be:

in separate form, i.e. in uncombined form, so as to form a phase of defined formula;

in partially combined form, without forming an $M_{n+1\pm\epsilon 1}A_{1\pm\epsilon 2}X_{n\pm\epsilon 3}$ phase;

in partially combined form with regions of $M_{n+1\pm\epsilon 1}A_{1\pm\epsilon 2}X_{n\pm\epsilon 3}$ phase; or in completely combined form as an $M_{n+1\pm\epsilon 1}A_{1\pm\epsilon 2}X_{n\pm\epsilon 3}$ phase.

The mean particle size advantageously ranges from 10 to 200 nm.

It may be less than 100 nm, for example ranging from 10 to 50 nm.

The mean particle size of the powder may be evaluated by two different techniques: the measurement of the specific surface area by gas adsorption (the amount of gas adsorbed on the surface of the powder particles on a layer of monomolecular thickness enables the surface area to be determined and, knowing the mass and the density, the mean diameter of the powder particles is deduced therefrom) and the transmission electron microscopy (the powder is suspended in a solvent and dispersed by ultrasound, the powder being deposited on a microscope support and observed in at least ten regions—for each region, the diameter of each visible particle is generally determined automatically using image processing software).

According to the invention, M is a transition metal. The term "transition metal" is understood conventionally to mean a metal having an incompletely filled d-shell in the neutral atom state or in one of its usual oxidation states. These elements are distributed in three transition series:

the first transition series going from scandium to zinc;

the second transition series going from yttrium to cadmium; and the third transition series going from hafnium to mercury.

In particular, M may be an element chosen from Sc, Ti, Zr, Hf, V, Nb, Ta, Cr and Mo.

Apart from the elements M, A and X, the powder may contain additional chemical species. The chemical species in question may be present in adjustable proportions (typically up to 10% by weight relative to the total weight of the powder) and distributed as uniformly as possible, i.e. on the scale of each particle. The nature of these additional chemical species is determined by the intended application. They may for example be sintering agents, the role of which is to facilitate powder consolidation in order to obtain dense bulk material.

According to one provision of the invention, the powder of the invention may comprise the elements M, A and X in proportions of $(n+1)$, 1 and n respectively.

For example, the powder of the invention may comprise the elements M, A and X in proportions of 3, 1 and 2 respectively, represented symbolically by the formula $M_3AX_2$.

Advantageously, M may be Ti, A may be Si, Al or Ge, and X may be C, the corresponding phases thus being $Ti_3SiC_2$, $Ti_3AlC_2$ or $Ti_3GeC_2$.

For example, the powder of the invention may comprise the elements M, A and X in proportions of 2, 1 and 1 respectively, represented symbolically by the formula $M_2AX$. As examples, mention may be made of powders corresponding to the following phases:

when M corresponds to Ti: $Ti_2AlC$, $Ti_2AlN$, $Ti_2InN$, $Ti_2GeC$, $Ti_2SC$, $Ti_2GaN$, $Ti_2InC$, $Ti_2TlC$, $Ti_2SnC$, $Ti_2GaC$, $Ti_2CdC$, $Ti_2PbC$;

when M corresponds to Zr: $Zr_2InN$, $Zr_2SnC$, $Zr_2SC$, $Zr_2InC$, $Zr_2TlC$, $Zr_2PbC$, $Zr_2TlN$;

when M corresponds to Hf: $Hf_2PbC$, $Hf_2InN$, $Hf_2SnN$, $Hf_2SnC$, $Hf_2SC$, $Hf_2TlC$, $Hf_2InC$;

when M corresponds to Cr: $Cr_2GaC$, $Cr_2AlC$, $Cr_2GaN$;

when M corresponds to V: $V_2AsC$, $V_2AlC$, $V_2PC$, $V_2GaN$, $V_2GaC$, $V_2GeC$;

when M corresponds to Nb: $Nb_2AlC$, $Nb_2GaC$, $Nb_2AsC$, $Nb_2SnC$, $Nb_2PC$, $Nb_2InC$, $Nb_2SC$;

when M corresponds to Ta: $Ta_2AlC$, $Ta_2GaC$;

when M corresponds to Mo: $Mo_2GaC$.

For example, the powder of the invention may also comprise the elements M, A and X in proportions of 4, 1 and 3 respectively, represented symbolically by the formula $M_4AX_3$. As examples, mention may be made of powders corresponding to phases chosen from $Ti_4AlN_3$ and $Ta_4AlC_3$.

According to one particular embodiment of the invention, M may be partially substituted with another transition metal or another metal such as Al and/or A may be partially substituted with another element belonging to the list of alternatives for A mentioned above and/or X may be partially substituted with another element belonging to the list of alternatives for X mentioned above.

Powders satisfying the specificity may be powders corresponding to phases chosen from: $(Ti,Zr)_3SiC_2$, $(Ti,Hf)_3SiC_2$, $(Ti,Hf)_3(Si,Ge)C_2$, $(Ti,Zr)_3(Si,Ge)(C,N)_2$, $(Ti,V)_3SiC_2$, $(Ti,V)_3Si(C,N)_2$, $Ti_3(Si,Al)C_2$, $(Ti,V)_3(Si,Ge)(C,N)_2$, $(Ti,V,Hf)_3(Si,Ge)(C,N)_2$, $(Ti,V,Hf)_3(Si,Ge,Al)(C,N)_2$, $(Nb,Ti)_2AlC$ and $TiAlN_{0.5}C_{0.5}$. One particular formula may be $(Ti_{2.8}Al_{0.2})SiC_2$. One particularly useful compound for nuclear applications is $(Ti,Zr)_3SiC_2$.

The invention also relates, in a second aspect, to a process for manufacturing a powder as defined above, which comprises the following steps:

a) a mixing step, with no heating and in the absence of oxygen, in which at least one precursor of M, at least one precursor of A and at least one precursor of X are mixed together, said precursors being in the form of a gas, a solid in suspension in a gas and/or a liquid in suspension in a gas; and b) a heating step, in which said mixture obtained in step a) is heated to a temperature effective for forming the powder.

Advantageously, this process can be used to obtain multi-element powders, the chemical composition of which may be varied by independently varying the flowrates of each of the precursors. What is more, thanks to the mixing step being carried out in gas form, in the form of a solid in suspension and/or a liquid in suspension in a gas, followed by a heating step, the process thus results in powders having the characteristics defined above.

Advantageously, the precursors are brought into contact with one another, within the mixing step, starting from separate streams, i.e. the mixing is carried out from a stream comprising the precursor of M, a stream comprising the precursor of A and a stream comprising the precursor of X.

The precursor of M, i.e. a transition metal, may be an M halide (such as $TiCl_4$), an M oxyhalide (such as $CrOCl_2$ or $VOCl_3$), an M carbonyl (such as $Mo(CO)_6$), an M oxyalkyl (such as $[OCH(CH_3)_2]Nb$) or an M borane (such as $Zr(BH_4)_4$).

The precursor of A may be an A hydride (such as $SiH_4$, $Si_2H_6$ and $GeH_4$), an A hydrohalide (such as $SiH_2Cl_2$) or an alkylated M complex (such as $Al(CH_3)_3$).

Finally, the precursor of X is a carbon, boron or nitrogen precursor.

Suitable carbon precursors may be acetylene ($C_2H_2$) and ethylene ($C_2H_4$).

Suitable boron precursors may be boron halides (such as $BCl_3$) or boranes (such as $B_2H_6$ and $B_4H_6$).

A suitable nitrogen precursor may be ammonia ($NH_3$).

If the precursors of M, A or X take the form of a powder or a liquid, they will advantageously be mixed in suspension in a gas called a "carrier gas" so as to form the appropriate streams. In the case of a solid, they may also be in solution in a liquid, which liquid will then be put in suspension in a carrier gas, in order to form an aerosol. The term "carrier gas" is understood to mean any gas that does not enter the composition of the product obtained. This is preferably an inert gas, such as argon, or a gas which, although participating in the reaction, is entirely removed at the end of the process in gaseous form. The function of the carrier gas is to make it possible to transport the liquid and solid reactants with a controlled flow rate.

When the precursors of M take the form of halides, they may be prepared in situ just before the mixing step a).

More precisely, the halides may be prepared in a halidization device, such as a chloridizer, in which device metal powders of M are heated in the presence of haloacids at a temperature effective for obtaining the corresponding gaseous M halides. This temperature is advantageously below 1000° C. and preferably below 500° C. The advantage of using this in situ preparation is the low cost, since metal powders are less expensive than conventional precursors.

For example, the precursor $ZrCl_4$ may be prepared by exposing a zirconium metal powder to hydrochloric acid vapour at a temperature below 1000° C.

The advantage of introducing the precursors in this type of form (namely a gas, suspended liquid or suspended solid) is that it ensures effective control of the flow rate and adjustment of the stoichiometry.

This is because the chemical formula of the precursor, when in the form of a gas, a suspended liquid or a suspended solid, makes it possible to determine the correspondence between the number of moles of the reactive, species (M, A and X) and the number of moles of the element in the composition of the powder (for example, each mole of $C_2H_2$ gas contains two moles of carbon). Knowing the number of moles of precursor per unit volume at a given pressure, controlling the flow rate of the fluids containing the precursors is equivalent to controlling the proportions of atoms intended to form the powder and therefore to controlling its stoichiometry, thus avoiding the formation of secondary species (for example TiC when a $Ti_3SiC_2$ powder is formed).

When some of M, A and X is substituted so as to form solid solutions, the precursors containing the substituent elements are also introduced in a form chosen from gas, suspended liquid and suspended solid.

It should also be noted that when the powders have to contain, after the process, additional chemical species, these will be advantageously introduced during the mixing step, again in the form of a gas or a solid or liquid in suspension in a carrier gas.

According to the invention, the various precursors in suitable form (gas, suspended liquid, suspended solid) are then mixed together, without being heated and away from oxygen.

This mixing may take place in a reactor by dint of the turbulence generated by the inflow of the precursors into the reactor chamber and/or also by means of a mixer present in the reactor. This mixing step ensures that there is relative homogeneity between the various precursors. It is important for this mixing to take place away from oxygen, so as not to compromise the purity of the powder obtained after the process.

Once the mixture has been obtained, it is directed, according to the invention, into a reaction zone, where it is heated to a temperature effective for forming the powder. This temperature may correspond to a temperature necessary to create a plasma, when the heating technique used is plasma heating, or else a temperature ranging from 1000 to 2000° C., when the heating technique used is laser heating. Such temperatures cause the powder to react very rapidly and almost instantaneously, and prevent the most volatile chemical species from escaping in gas form before having been able to participate in the reaction. The heat released during the reaction causes molecular agitation, such that the high frequency of the collisions guarantees chemical homogeneity of the medium, if it be that homogeneity had not already been achieved during the preceding mixing step.

A person skilled in the art will be able to adjust the reaction parameters, such as the flow rate of the mixture or the powder delivered by the heat source.

By varying the flow rate of the mixture, which will determine the residence time of the mixture in the reaction zone (typically of the order of a few milliseconds), it will be possible to adjust the particle size of the powder.

By varying the power delivered by the heat source, it will be possible to adjust the degree of crystallinity of the powder, given that the lower the temperature the closer the structure of the powder formed will be to an amorphous configuration, and the higher the temperature the more crystalline the structure.

Advantageously, the reaction step is a step that takes place in flow mode, that is to say the powder formed in the reactor is continuously removed by suction, making space for the incoming mixture of reactants. This feature means that the production of a large amount of powder can be envisaged.

The powders obtained according to this process may be used to make up bulk materials, which may be nanostructured single-phase materials or nanostructured composites.

The term "single-phase material" is understood to mean a material essentially comprising just one phase, which comprises, within the context of the invention, at least one element M, at least one element A and at least one element X in respective proportions of $n+1\pm\epsilon_1$, $1\pm\epsilon_2$ and $n\pm\epsilon_3$, n, $\epsilon_1$, $\epsilon_2$ and $\epsilon_3$ being as defined above. The term "essentially" is understood to mean that the phase constitutes at least 95%, or 97% or even 99% of the material.

The term "nanostructured material" is understood to mean a material comprising particles with a size generally of less than 100 nanometers.

The term "composite" is understood to mean a material comprising a matrix in which reinforcing elements are dispersed.

Thus, the invention relates to a process for manufacturing a nanostructured single-phase material, which includes a step of compressing the powder as defined above, preferably at room temperature, and a sintering step so as to consolidate the material. To facilitate the sintering, a sintering agent may be added to the powder before it is consolidated. It should be noted that this sintering agent may also be added to the preparation of the powder, as mentioned above.

According to one particular method of implementing this process, the material may be prepared using the following sequence of steps:

a step of compressing the powder as defined above, at room temperature, preferably under a pressure ranging from 500 to 1500 MPa, after which a first precompact is obtained;

a grinding step, in which the first precompact is ground so as to obtain agglomerates, preferably of micron size;

a compression step, in which said agglomerates are compressed at room temperature, preferably under a pressure ranging from 200 to 400 MPa, after which a second precompact is obtained;

optionally, a machining step, in which said second precompact is machined so as to give it a defined shape; and a consolidation step, in which said second precompact is consolidated by sintering, preferably at a temperature ranging from 1000 to 2000° C., more preferably ranging from 1000 to 1500° C., optionally under a pressure preferably ranging from 0 to 200 MPa, all of these steps being optionally carried out away from oxygen.

The invention also relates to a nano-structured single-phase material that can be obtained by a process as defined above. In the case of these materials, because they are prepared from the powders of the invention, the chemical composition is homogeneous on the scale of each particle, the size of which may vary from 5 to 500 nm and the particle size distribution of which is controlled and may be narrow (for example 90% of the particles have a size between 20 and 50 nm).

The invention also relates to the preparation of composites.

Various composites may be distinguished according to the invention:

composites comprising a matrix obtained from the powders of the invention, in which matrix particulate reinforcing elements (for example those having a mean particle size ranging from a few microns to a few tens of microns) are dispersed;

composites comprising a matrix obtained from the powders of the invention, in which matrix short fibres (generally less than 1 cm in length, also called whiskers), generally having a random orientation, are dispersed as reinforcing elements; and composites comprising a matrix obtained from the powders of the invention and long fibres as reinforcing elements. The long fibres generally have a length ranging from 1 cm to several centimeters (or have a length of the order of magnitude of the part for which they are intended). They may form, prior to the formation of the composite, a preform.

When the reinforcing elements are particulate reinforcing elements and/or short fibres, the process of the invention generally includes a step of mixing the powders of the invention with the reinforcing elements and a sintering step.

According to one particular method of implementing this process, such a composite, in particular when the reinforcing elements are short fibres, may be prepared according to the following sequence of steps:

a compression step, in which the powder according to the invention is compressed at room temperature under a pressure preferably ranging from 500 to 1500 MPa, after which a first precompact is obtained;

a grinding step, in which the first precompact is ground so as to obtain agglomerates, preferably of micron size;

a mixing step, in which said agglomerates are mixed with the reinforcing elements;

a compression step, in which said mixture is compressed at room temperature, preferably under a pressure ranging from 200 to 400 MPa, after which a second precompact is obtained;

optionally, a machining step, in which said second precompact is machined to give it a defined shape; and a consolidation step, in which said second precompact is consolidated by sintering, preferably at a temperature ranging from 1000 to 2000° C. and more preferably 1000 to 1500° C., optionally under a pressure preferably ranging from 0 to 200 MPa, all of these steps preferably being carried out away from oxygen.

In particular, the reinforcing elements may be particles or short fibres of carbon, silicon carbide (SiC) or other ceramics (oxides, carbides, nitrides, oxycarbides, carbonitrides, silicides or borides), such as alumina. It should be mentioned that short fibres (or whiskers) are generally understood to mean fibrous single crystals having in particular excellent mechanical properties in terms of elastic modulus and tensile strength.

The invention also relates to a nano-structured composite that can be obtained by a process as defined above.

When the reinforcing elements are long fibres, the process for preparing composites generally includes a step of suspending the powders according to the invention, a step of infiltrating a preform consisting of said long fibres with said suspension, and a sintering step so as to consolidate the material.

According to one particular method of implementing this process, such a composite may be prepared according to the following sequence of steps:

a step of suspending the powders according to the invention in an aqueous or organic medium, optionally using dispersants and/or binders and optionally subjecting said suspension to ultrasound so as to dissociate any agglomerates;

a step of infiltrating a preform consisting of long fibres, possibly woven fibres, said infiltration step possibly being carried out by electrophoresis or by pressure infiltration;

a step of drying the assembly obtained after infiltration;

a step of consolidating said assembly obtained after drying, by sintering, preferably at a temperature ranging from 1000 to 2000° C., more preferably 1000 to 1500° C., optionally under a pressure preferably ranging from 0 to 200 MPa, all of these steps being preferably carried out away from oxygen.

When the sintering is carried out under pressure, this is advantageously applied perpendicular to the fibre weave so as not to damage the fibres.

The reinforcing elements may be long carbon or silicon carbide (SiC) fibres or ceramic (oxide, carbide, nitride, oxycarbide, carbonitride, silicide or boride) fibres, such as alumina fibres.

The invention also relates to a nano-structured composite that can be obtained by a process as defined above.

The composites, whatever the nature of their reinforcing elements, may be applicable in all fields involving the use of refractories, such as the nuclear industry or in aeronautics.

BRIEF DESCRIPTION OF THE DRAWINGS

The single FIGURE illustrates a device for implementing the embodiments illustrated in the example.

DETAILED DESCRIPTION OF PARTICULAR EMBODIMENTS

EXAMPLE 1

This example illustrates the preparation of a $Ti_3SiC_2$ powder by laser pyrolysis in the device shown in FIG. 1.

The silicon, carbon and titanium precursors were silicon hydride ($SiH_4$), acetylene ($C_2H_2$) and titanium tetrachloride ($TiCl_4$) respectively.

The abovementioned precursors were introduced into a mixing chamber, with the reference 1, in respective proportions of 1, 1 and 3, the $SiH_4$ and $C_2H_4$ being in gas form and $TiCl_4$ in vapour form obtained in an evaporator, with the reference 3, having an inert gas inlet, with the reference 2. The mixture obtained was introduced into a laser pyrolysis reactor 5, where the pressure was 900 mbar and the flame temperature was between 1000 and 2000° C., the chamber having an outlet, with the reference 7, for discharging the powders formed. The line conveying the $TiCl_4$ vapour to the reactor was kept at a temperature of 150° C. so as to prevent the vapour from recondensing. By respecting the proportions of 1, 1 and 3, by simply adjusting the flow rate of the incoming reactants, the $Ti_3SiC_2$ stoichiometry of the nanopowders produced was guaranteed. It was possible to observe in this powder that the Ti, Si and C elements were uniformly distributed on a nanoscale or even on an atomic scale. By taking respective flow rates of 1.5, 1.5 and 4.5 l/min for $SiH_4$, $C_2H_2$ and $TiCl_4$ respectively, the production rate of $Ti_3SiC_2$ rose to 600 g/h.

The particle size of the powders obtained was less than 100 nm.

EXAMPLE 2

This example illustrates the preparation of a $Ti_2SnC$ powder by laser pyrolysis in a device like that shown in the single FIGURE.

The titanium, tin and carbon precursors were titanium tetrachloride ($TiCl_4$), tin tetrachloride ($SnCl_4$) and acetylene ($C_2H_2$) respectively.

The abovementioned precursors were introduced, in the same way as previously, with respective proportions of 2, 1 and ½.

EXAMPLE 3

This example illustrates the preparation of a $Ti_4AlC_3$ powder by laser pyrolysis in a device similar to that shown in the single FIGURE.

The titanium, aluminium and carbon precursors were titanium tetrachloride ($TiCl_4$), aluminium trichloride ($AlCl_3$) and acetylene ($C_2H_2$) respectively.

The abovementioned precursors were introduced, in the same way as previously, in the respective proportions of 4, 1 and 3/2.

The invention claimed is:

1. A process for manufacturing a powder comprising an element M, an element A, and an element X, in the respective proportions $(n+1\pm\epsilon_1)$, $1\pm\epsilon_2$ and $n\pm\epsilon_3$, wherein:
   A is selected from the group consisting of Cd, Al, Ga, In, Tl, Si, Ge, Sn, Pb, P, As, and S;
   M is a transition metal;
   X is selected from the group consisting of B, C, and N;
   n is an integer equal to 1, 2, or 3; and
   $\epsilon_1$, $\epsilon_2$, and $\epsilon_3$ independently represent a number ranging from 0 to 0.2,
   said powder having a mean particle size ranging from 10 to 200 nm,
   comprising:
   a) mixing together, with no heating and in the absence of oxygen, a precursor of M, a precursor of A and a precursor of X to obtain a mixture, said precursors being in the form of a gas, a solid in suspension in a gas, and/or a liquid in suspension in a gas; and
   b) heating said mixture obtained in step a) to a temperature effective for forming the powder.

2. The manufacturing process of claim 1, wherein the mixing together is carried out from a stream comprising a precursor of M, a stream comprising a precursor of A, and a stream comprising a precursor of X.

3. The manufacturing process of claim 1, wherein the precursor of M is selected from the group consisting of M halides, M oxyhalides, M carbonyls, M oxyalkyls, and M boranes.

4. The manufacturing process of claim 1, wherein the precursor of A is selected from the group consisting of A hydrides, A hydrohalides, and alkylated M complexes.

5. The manufacturing process of claim 1, wherein the precursor of X is a carbon precursor selected from the group consisting of acetylene and ethylene.

6. The manufacturing process of claim 1, wherein the precursor of X is a boron precursor selected from the group consisting of boron halides and boranes.

7. The manufacturing process of claim 1, wherein the precursor of X is $NH_3$.

8. The manufacturing process of claim 1, including, before step a), when the precursor of M is an M halide, preparing said precursor of M, consisting in heating a metal powder of M in the presence of haloacids at a temperature effective for obtaining the corresponding M halide.

9. The manufacturing process of claim 1, wherein heating said mixture is carried out at a temperature sufficient for creating a plasma or a temperature ranging from 1000 to 2000° C.

* * * * *